(12) United States Patent
Fujinaga

(10) Patent No.: US 11,943,528 B2
(45) Date of Patent: Mar. 26, 2024

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Takashi Fujinaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 17/705,168

(22) Filed: Mar. 25, 2022

(65) Prior Publication Data
US 2022/0321768 A1  Oct. 6, 2022

(30) Foreign Application Priority Data
Mar. 30, 2021 (JP) .................. 2021-058390

(51) Int. Cl.
*H04N 23/62* (2023.01)
*H04N 23/661* (2023.01)
*H04N 23/69* (2023.01)
*H04N 23/695* (2023.01)

(52) U.S. Cl.
CPC ........... *H04N 23/62* (2023.01); *H04N 23/661* (2023.01); *H04N 23/69* (2023.01); *H04N 23/695* (2023.01)

(58) Field of Classification Search
CPC .... H04N 23/695; H04N 23/661; H04N 23/69; H04N 23/62; H04N 7/183; H04N 23/64; H04N 23/66; H04N 7/18; H04N 7/181; H04N 23/61; H04N 23/90; H04N 23/611; H04N 23/698; H04N 23/631; H04N 23/51
See application file for complete search history.

(56) References Cited

U.S. PATENT DOCUMENTS

2010/0259636 A1* 10/2010 Tzur ...................... H04N 23/70
348/222.1

FOREIGN PATENT DOCUMENTS

| JP | H06276423 A | 9/1994 |
| JP | 2005020399 A | 1/2005 |
| JP | 2007282069 A | 10/2007 |
| JP | 2016119627 A | 6/2016 |

* cited by examiner

*Primary Examiner* — Samira Monshi
(74) *Attorney, Agent, or Firm* — Canon U.S.A., Inc. IP Division

(57) ABSTRACT

An information processing apparatus accepts information on a user's operation to specify a target imaging range, which is an imaging range to be attained, of an imaging apparatus that captures an image; accepts information on a user's operation to specify a moving time, which is a time to reach the target imaging range from a current imaging range of the imaging apparatus; and causes a display to display information indicating a result of comparison between the moving time and a required time required to reach the target imaging range from the current imaging range. The required time is calculated based on the current imaging range of the imaging apparatus and the target imaging range.

9 Claims, 8 Drawing Sheets

INFORMATION PROCESSING APPARATUS, INFORMATION PROCESSING METHOD, AND PROGRAM

BACKGROUND OF THE DISCLOSURE

Field of the Disclosure

The present disclosure relates to a method of controlling an imaging apparatus.

Description of the Related Art

Techniques have hitherto been provided to vary the imaging direction or the angle of view of an imaging apparatus that captures an image to change an imaging range. The imaging apparatus capable of changing the imaging range can change the imaging range by varying pan-tilt-zoom (PTZ).

In addition, a shot operation is used as a function to control the imaging apparatus, shot operation is a function to, when a target imaging range, which is the imaging range to be attained, and a moving time to the target imaging range are specified, drive the PTZ of the imaging apparatus from the current imaging range to the specified target imaging range and cause the imaging apparatus to reach the target imaging range within the specified moving time.

Japanese Patent Laid-Open No, 2007-282069 discloses a method of performing a shot operation, in which the pan-tilt-zoom of an imaging apparatus is controlled so that the imaging apparatus reach a target position from the current position within a specified time specified by a user.

However, with the shot operation method disclosed in Japanese Patent Laid-Open No. 2007-282069, the user is not capable of determining whether the imaging apparatus reaches the target imaging range from the current imaging range within the specified moving time until the user performs the shot operation.

SUMMARY OF THE DISCLOSURE

In order to provide a technique enabling a user to determine in advance whether an imaging apparatus is capable of reaching the target imaging range from the current imaging range within a specified moving time, an information processing apparatus according to an embodiment of the present disclosure includes a computer executing instructions that, when executed by the computer, cause the computer to accept information on a user's operation to specify a target imaging range, which is an imaging range to be attained, of an imaging apparatus that captures an image; accept information on a user's operation to specify a moving time, which is a time to reach the target imaging range from a current imaging range of the imaging apparatus; and cause a display to display information indicating a result of comparison between the moving time and a required time required to reach the target imaging range from the current imaging range. The required time is calculated based on the current imaging range of the imaging apparatus and the target imaging range.

Further features of the present disclosure will become apparent from the following description of exemplary embodiments with reference to the attached drawings.

DESCRIPTION OF THE EMBODIMENTS

Embodiments of the present disclosure will herein be described with reference to the drawings. The configurations described in the following embodiments are only examples and the present disclosure is not limited to the illustrated configurations.

Embodiment

Figure 1:
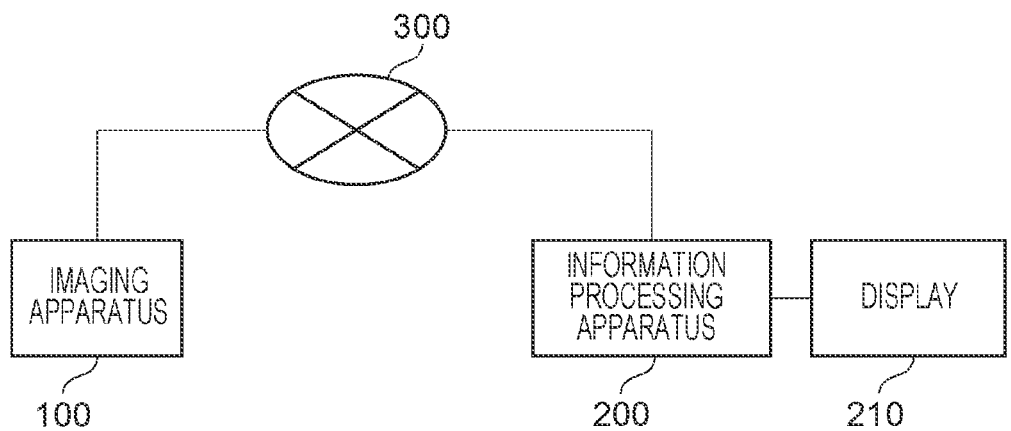
FIG. 1 is a diagram illustrating an example of the configuration of a system in an embodiment.

FIG. 1 is a diagram illustrating an example of the configuration of a system in an embodiment. The system of the present embodiment includes an imaging apparatus 100, an information processing apparatus 200, a display 210, and a network 300.

The imaging apparatus 100 and the information processing apparatus 200 are connected to each other over the network 300. The network 300 is realized by multiple routers, switches, cables, and so on conforming to a communication standard, such as Ethernet (registered trademark).

The network 300 may be realized by the Internet, a wired local area network (LAN), a wireless LAN, a wide area network (WAN), or the like.

The imaging apparatus 100 is an apparatus that captures an image and functions as an imaging apparatus capable of changing the imaging range. The imaging apparatus 100 transmits image data about an image that is captured, information about an imaging date and time when the image is captured, identification information for identifying the imaging apparatus 100, and information about the imaging range of the imaging apparatus 100 to an external apparatus, such as the information processing apparatus 200, over the network 300. The information processing apparatus 200 is, for example, a client apparatus, such as a personal computer, in which programs for realizing the functions of processes described below are installed. Although one imaging apparatus 100 is provided in the system in the present embodiment, multiple imaging apparatuses 100 may be provided in the system. Specifically, the multiple imaging apparatuses 100 may be connected to the information processing apparatus 200 over the network 300. In this case, for example, the information processing apparatus 200 determines which imaging apparatus 100, among the multiple imaging apparatuses 100, has captured the transmitted image using the identification information associated with the transmitted image.

The display 210 is composed of a liquid crystal display (LCD) or the like and displays the image captured by the imaging apparatus 100 and so on. The display 210 is connected to the information processing apparatus 200 via a display cable conforming to a communication standard, such as high-definition multimedia interface (HDMI) (registered trademark). The display 210 and the information processing apparatus 200 may be provided in a single casing.

Figure 2:
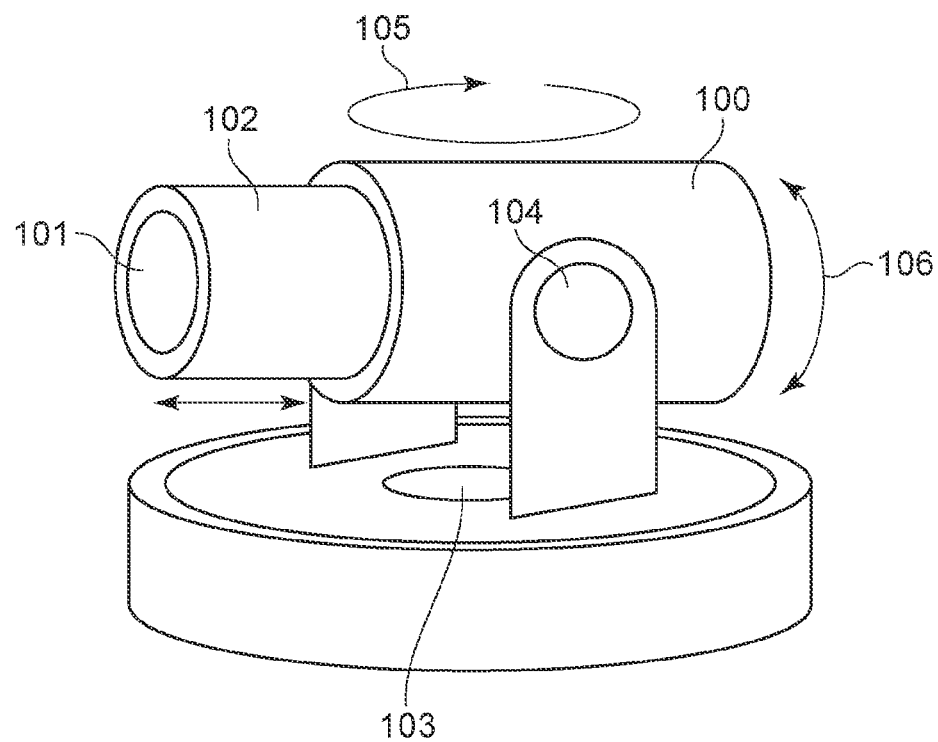
FIG. 2 is an example of the external view of an imaging apparatus in the embodiment.
Figure 3:
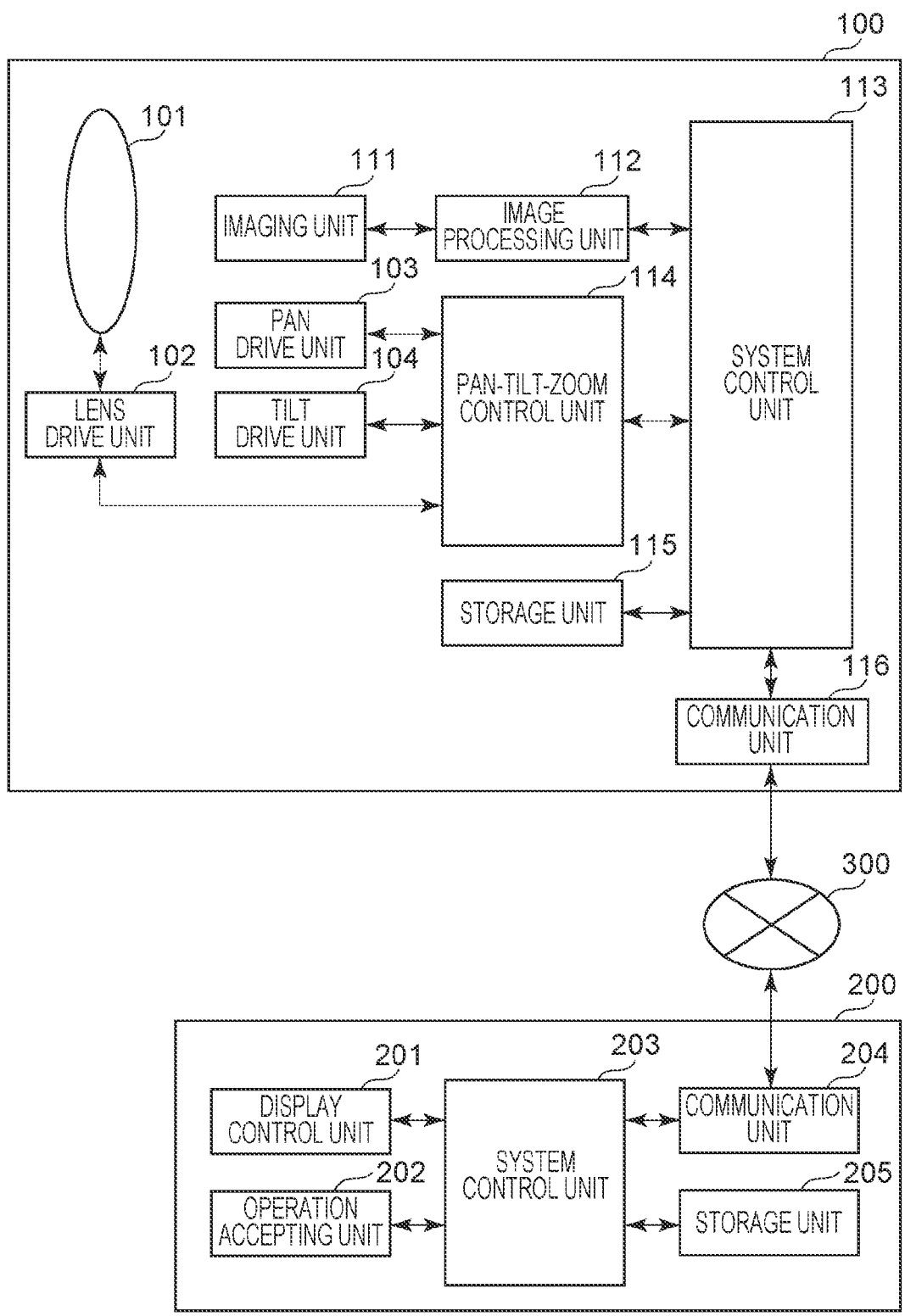
FIG. 3 is a diagram illustrating an example of functional blocks in the present embodiment.

The imaging apparatus 100 according to the present embodiment will now be described with reference to FIG. 2 and FIG. 3. FIG. 2 is an example of the external view of the imaging apparatus 100 according to the present embodiment. FIG. 3 is a diagram illustrating an example of the functional blocks of the imaging apparatus 100 and the information processing apparatus 200 according to the present embodiment. Among the functional blocks of the imaging apparatus 100 illustrated in FIG. 3, the respective functions of an image processing unit 112, a system control unit 113, a pan-tilt-zoom control unit 114, a storage unit 115, a communication unit 116, and so on are realized in the following manner. Specifically, the respective functions are realized by a central processing unit (CPU) 700 in the imaging apparatus 100, which executes computer programs stored in a read only memory (ROM) 720 in the imaging apparatus 100. The CPU 700 and the ROM 720 will be described below with reference to FIG. 7.

The direction to which the optical axis of a lens 101 is directed is an imaging direction of the imaging apparatus 100. The light flux that has passed through the lens 101 forms an image on an imaging device in an imaging unit 111 in the imaging apparatus 100. A lens drive unit 102 is composed of a drive system driving the lens 101 and varies the focal length of the lens 101. The lens drive unit 102 is controlled by the pan-tilt-zoom control unit 114.

A pan drive unit 103 is composed of a mechanical drive system that performs a pan operation and a motor, which is a drive source. The pan drive unit 103 controls rotational driving for rotationally driving the imaging direction of the imaging apparatus 100 in a pan direction 105. The pan drive unit 103 is controlled by the pan-tilt-zoom control unit 114.

A tilt drive unit 104 is composed of a mechanical drive system that performs a tilt operation and a motor, which is a drive source. The tilt drive unit 104 controls rotational driving for rotationally driving the imaging direction of the imaging apparatus 100 in a tilt direction 106. The tilt drive unit 104 is controlled by the pan-tilt-zoom control unit 114.

The imaging unit 111 is composed of an imaging device (not illustrated), such as a charge coupled device (CCD) sensor or a complementary metal oxide semiconductor (CMOS) sensor. The imaging unit 111 performs photoelectric conversion of an image of a subject, which is formed through the lens 101, to generate an electrical signal. The image processing unit 112 performs a process to convert the electrical signal subjected to the photoelectric conversion in the imaging unit 111 into a digital signal and image processing, such as encoding, to generate image data.

The pan-tilt-zoom control unit 114 controls the pan drive unit 103, the tilt drive unit 104, and the lens drive unit 102 based on instructions supplied from the system control unit 113 to control pan-tilt-zoom of the imaging apparatus 100.

The storage unit 115 stores (holds), for example, information indicating the imaging range. The communication unit 116 communicates with the information processing apparatus 200 via an interface (I/F) 740, which will be described below with reference to FIG. 7. For example, the communication unit 116 transmits the image data about an image captured by the imaging apparatus 100 to the information processing apparatus 200 over the network 300. In addition, the communication unit 116 transmits information indicating the current imaging range of the imaging apparatus 100. Furthermore, the communication unit 116 receives a control command, which is transmitted from the information processing apparatus 200 and which is used to control the imaging apparatus 100, and supplies the received control command to the system control unit 113.

Figure 7:
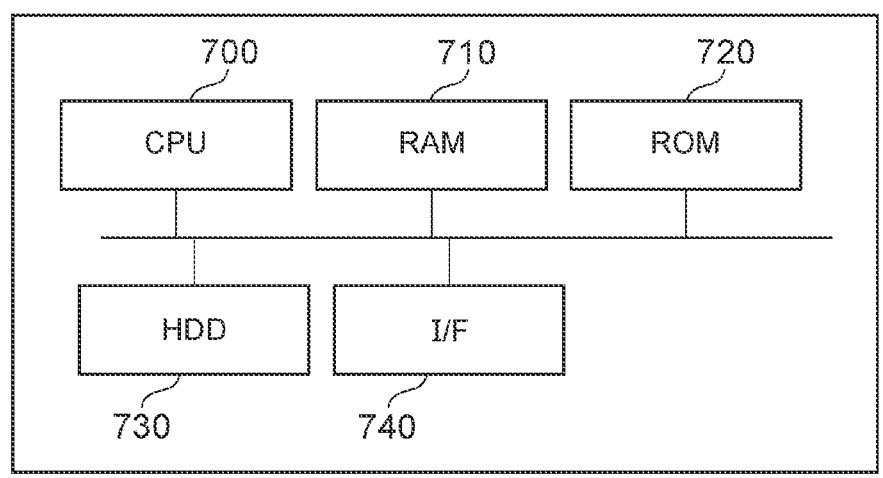
FIG. 7 is a diagram illustrating an example of the hardware configuration of each apparatus.

The system control unit 113 controls the entire imaging apparatus 100 in accordance with the processes performed by the CPU 700 described below with reference to FIG. 7 to perform, for example, the following process. Specifically, the system control unit 113 analyzes the control command, which is transmitted from the information processing apparatus 200 and which is used to control the imaging apparatus 100, to perform the process corresponding to the control command. In addition, the system control unit 113 issues an instruction about a pan-tilt-zoom operation to the pan-tilt-zoom control unit 114. Furthermore, the system control unit 113 adds information about the imaging time when the image data has been captured and the information about the imaging range to the image data in transmission of the image data generated by the image processing unit 112 to the information processing apparatus 200.

The imaging range in the present embodiment is defined by a pan value, a tilt value, and a zoom value of the imaging apparatus 100. The pan value is the angle of the imaging direction (the optical axis) in the pan direction 105 of the imaging apparatus 100 when one drive end of the pan drive unit 103 is set to 0°. The tilt value is the angle of the imaging direction (the optical axis) in the tilt direction 106 of the imaging apparatus 100 when one drive end of the tilt drive unit 104 is set to 0°. The zoom value of the imaging apparatus 100 when an image is captured by the imaging apparatus 100 is calculated from the focal length of the lens 101.

Furthermore, the system control unit 113 performs a process concerning a shot operation described below. For example, the system control unit 113 calculates parameters for realizing the shot operation from the current imaging range and a target imaging range, which is the imaging range to be attained, and further calculates a time required for the shot operation. At this time, the system control unit 113 calculates the difference (the amount of drive) between the current imaging range of the imaging apparatus 100 and the target imaging range of the shot operation for each of the pan value, the tilt value, and the zoom value. Furthermore, the system control unit 113 calculates the following parameters in driving of the pan-tilt-zoom from the current imaging range to the target imaging range. Specifically, the system control unit 113 calculates a pan required time, which is the time required to drive the pan, a tilt required time, which is the time required to drive the tilt, and a zoom required time, which is the time required to drive the zoom. Then, the system control unit 113 calculates the maximum value, among the pan required time, the tilt required time, and the zoom required time, as the required time to the target imaging range.

Information processing in the information processing apparatus 200 according to the present embodiment will now be described with reference to the functional blocks of the information processing apparatus 200 illustrated in FIG. 3. The respective functions of the information processing apparatus 200 are realized in the following manner using the ROM 720 and the CPU 700, which will be described below with reference to FIG. 7. Specifically, the respective functions illustrated in FIG. 3 are realized by the CPU 700 in the information processing apparatus 200, which executes the computer programs stored in the ROM 720 in the information processing apparatus 200.

A display control unit 201 displays an image captured by the imaging apparatus 100 and a setting screen concerning the shot operation in the display 210. An operation accepting unit 202 accepts information about an operation by a user with an input device (not illustrated), such as a keyboard, a mouse, or a touch panel. For example, buttons, the mouse, or a joystick is assumed as an input unit, which accepts various operations by the user or the like. Here, for example, the display control unit 201 displays the setting screen used to make settings concerning the shot operation in the display 210 and the operation accepting unit 202 accepts information about a user's operation on the setting screen displayed in the display 210. A system control unit 203 transmits the control command to a remote camera via a communication unit 204 in response to the operation by the user or the like.

The communication unit 204 transmits various setting commands supplied from the system control unit 203 and the control command for the imaging apparatus 100 to the imaging apparatus 100 via the I/F 740 described below with reference to FIG. 7. In addition, the communication unit 204 receives image data transmitted from the imaging apparatus 100 and a response from the imaging apparatus 100 to the command transmitted from the information processing apparatus 200 to the imaging apparatus 100 and supplies the image data and the received response to the system control unit 203. A storage unit 205 stores information about the shot operation, an image acquired by the communication unit 204, and so on.

The system control unit 203 creates the various setting commands based on the user's operations accepted by the operation accepting unit 202 and the control command and transmits the created commands to the imaging apparatus 100 via the communication unit 204.

Figure 4:
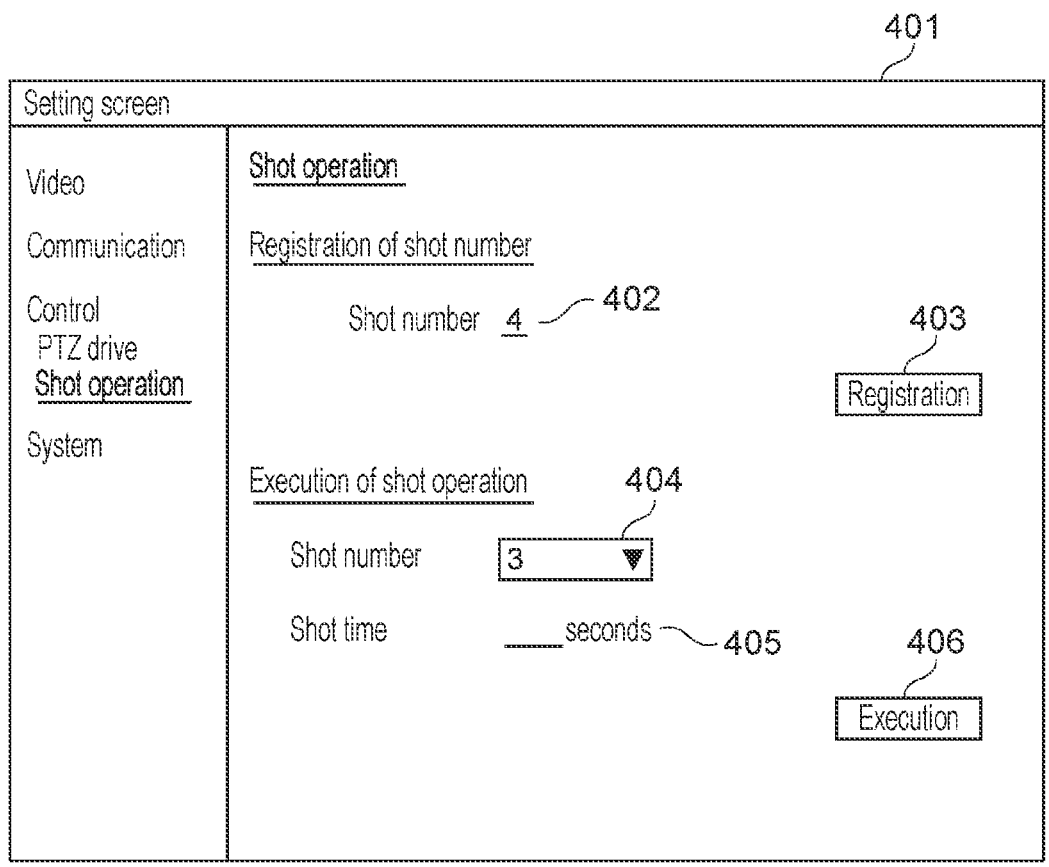
FIG. 4 illustrates a setting screen of a shot operation.

An example of a user interface when the shot operation is performed will now be described with reference to FIG. 4. A Setting screen 401 illustrated in FIG. 4 is displayed in the display 210 by the display control unit 201 and is used to accept the user's operations for settings concerning the shot operation. The Setting screen 401 in the present embodiment has a function to register a shot number associated with the setting of the target imaging range and a function to perform the shot operation. In order to use the function to register the shot number, the user controls the imaging range by controlling at least one of the pan, the tilt, and the zoom of the imaging apparatus 100 to set a desired imaging range, inputs the shot number with Registration of shot number 402, and touches a Registration button 403. At this time, information about the shot number input with the Registration of shot number 402 is transmitted from the information processing apparatus 200 to the imaging apparatus 100. The imaging apparatus 100 stores the current imaging range as the target imaging range of the shot operation in the storage unit 115 in association with the value of the shot number input with the Registration of shot number 402. Information about the pan value, the tilt value, and the zoom value, which indicates the target imaging range, is held as information about the stored target imaging range. The storage unit 205 in the information processing apparatus 200 may also hold the input shot number in association with the information about the target imaging range.

In addition, the following process is performed as the function to perform the shot operation on the Setting screen 401. Specifically, the operation accepting unit 202 accepts the user's operation to select one number, among the numbers registered with the Registration of shot number 402, with Selection of shot number 404 and accepts the user's operation to specify a moving time with Input of shot time 405. Upon acceptance of the user's operation to touch an Execution button 406, the information processing apparatus 200 transmits information about the shot number selected with the Selection of shot number 404 and information about the moving time specified with the Input of shot time 405 to the imaging apparatus 100. The imaging apparatus 100 performs the shot operation in the moving time specified for the shot operation in accordance with the information transmitted from the information processing apparatus 200.

Figure 5:
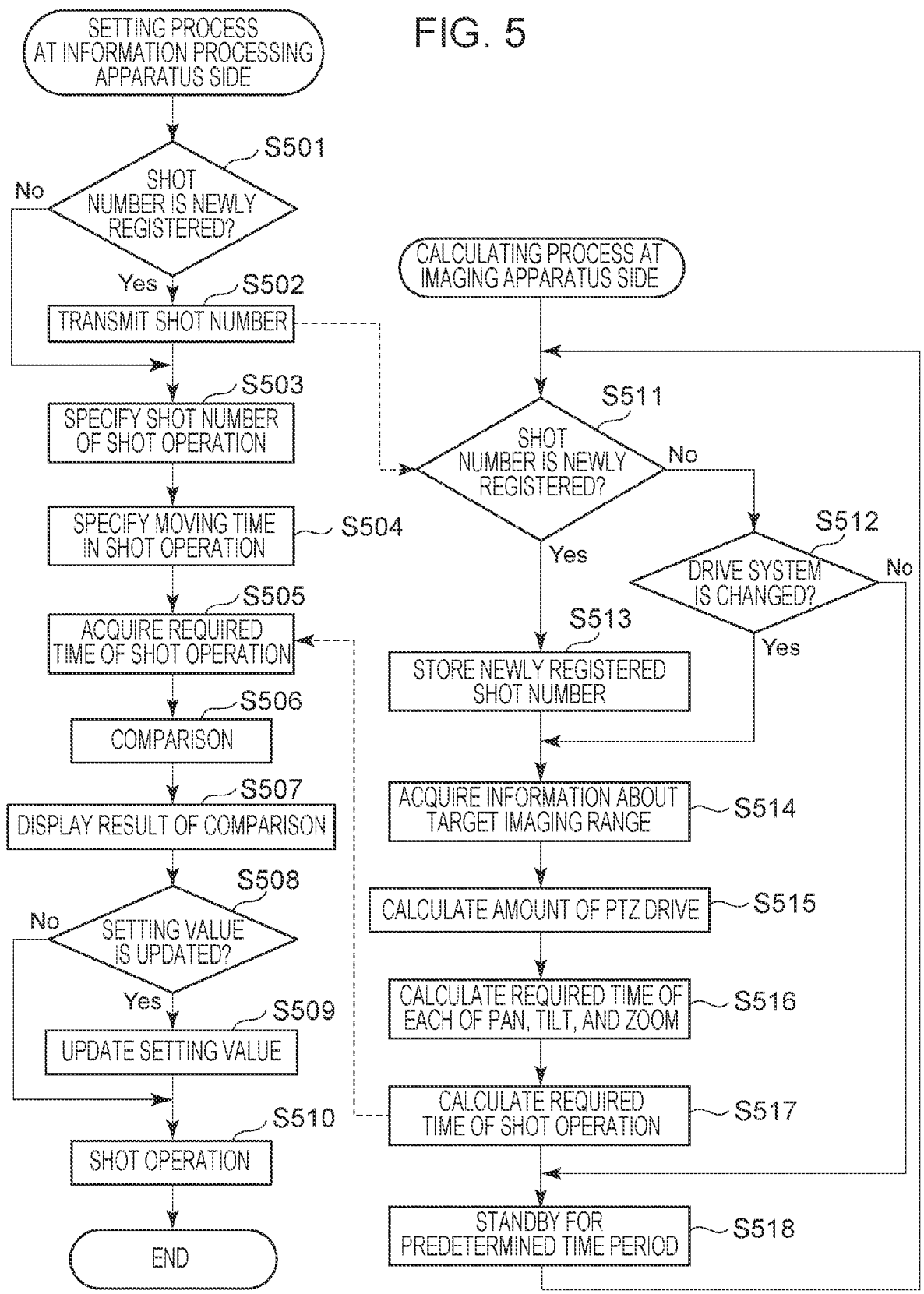
FIG. 5 is a flowchart illustrating a setting process and a calculating process.

A process concerning the shot operation according to the present embodiment will now be described with reference to a flowchart in FIG. 5. Step S501 to Step S510 in the flowchart in FIG. 5 are performed by the information processing apparatus 200. Step S501 to Step S510 are performed by the functional blocks illustrated in FIG. 3, which are realized by the CPU 700 in the information processing apparatus 200, which executes the computer programs stored in the ROM 720 in the information processing apparatus 200. Step S511 to Step S518 are performed by the imaging apparatus 100 and are performed by the functional blocks illustrated in FIG. 3, which are realized by the CPU 700 in the imaging apparatus 100, which executes the computer programs stored in the ROM 720 in the imaging apparatus 100.

Referring to FIG. 5, in Step S501, the system control unit 203 determines whether the shot number of the shot operation is newly registered. The process goes to Step S503 if the shot number of the shot operation is not newly registered. (No in Step S501) and the process goes to Step S502 if the shot number of the shot operation is newly registered (Yes in Step S501). At this time, the system control unit 203 determines that the shot number is newly registered when the operation accepting unit 202 accepts the user's operation to input the shot number with the Registration of shot number 402 and touch the Registration button 403, as described above with reference to FIG. 4, and the process goes to Step S502. In Step S502, the information about the shot number is transmitted to the imaging apparatus 100. The imaging apparatus 100 stores the current imaging range as the target imaging range in association with the transmitted information about the shot number. When the information about the imaging range of the imaging apparatus 100 is transmitted to the information processing apparatus 200, if needed, with the captured image, the following processing may be performed in Step S502. Specifically, in Step S502, the system control unit 203 may transmit the information about the shot number and the information about the imaging range at the time when the shot number is registered to the imaging apparatus 100. Here, the imaging apparatus 100 records the transmitted information about the imaging range as the target imaging range associated with the transmitted shot number. The imaging apparatus 100 stores information about the pan value, the tilt value, and the zoom value in the target imaging range in the storage unit 115 in association with the transmitted shot number. Multiple target imaging ranges may be registered in Step S502. The shot number and the information about the pan value, the tilt value, and the zoom value in the target imaging range, which is associated with the shot number, are stored in the storage unit 115 for each of the multiple registered shot numbers.

In Step S503, the operation accepting unit 202 accepts the user's operation to select the shot number of the target imaging range when the shot operation is performed from the registered shot numbers with the Selection of shot number 404. In Step S501, the operation accepting unit 202 accepts the user's operation to specify the moving time in the shot operation with the Input of shot time 405. The order of Step S503 and Step S504 is not limited to this and the user's operation to select the shot number may be performed after the moving time in the shot operation is specified. In Step S505, the information processing apparatus 200 acquires information about the required time required to realize the shot operation to cause the imaging apparatus 100 to reach the target imaging range associated with the shot number specified in Step S503. At this time, for example, the information processing apparatus 200 transmits a hypertext transfer protocol (HTTP) request for acquiring the required time to realize the shot operation of the specified shot number to the imaging apparatus 100 and acquires the information about the required time, transmitted from the imaging apparatus 100, as an HTTP response. The required time in the present embodiment is the time required to reach the target imaging range corresponding to the selected shot number from the current imaging range of the imaging apparatus 100 when the pan-tilt-zoom of the imaging apparatus 100 is driven at maximum speeds.

In Step S506, the system control unit 203 in the information processing apparatus 200 compares the required time required to reach the target imaging range corresponding to the selected shot number, which is acquired in Step S505, with the moving time specified by the user in Step S504. In Step S507, the display control unit 201 displays information about the result of the comparison in Step S506. For example, a case is assumed in which the required time required to reach the target imaging range corresponding to the shot number specified in Step S503 from the current imaging range is 10 seconds and the moving time specified in Step S504 is eight seconds. Since the required time is longer than the specified moving time in this case, the display control unit 201 displays information (for example, a message) indicating that the shot operation is not capable of being realized within the specified moving time in Step S507. When the required time acquired in Step S505 is 10 seconds and the moving time specified in Step S504 is 12 seconds, the required time is shorter than the specified moving time. In this case, the display control unit 201 displays information (for example, a message) indicating that the shot operation is capable of being realized within the specified moving time. In Step S508, the system control unit 203 determines whether a setting value concerning the shot operation is updated. For example, when the operation accepting unit 202 accepts the user's operation to update the moving time specified with the Input of shot time 405, the system control unit 203 determines that the setting value is updated (Yes in Step S508) and the process goes to Step S509. In Step S509, the system control unit 203 updates the setting value. For example, when the operation accepting unit 202 accepts the user's operation to update the moving time specified with the Input of shot time 405, the system control unit 203 updates the moving time to the updated value. In Step S510, when the operation accepting unit 202 accepts the users operation to touch the Execution button 406, the communication unit 204 transmits the information about the shot number selected in Step S503 and the information about the moving time specified in Step S504 to the imaging apparatus 100. The imaging apparatus 100 performs the shot operation in accordance with the transmitted information.

A process of calculating the required time in the imaging apparatus 100 will now be described with reference to Step S511 to Step S518 in FIG. 5. In Step S511, the system control unit 113 determines whether the shot number is newly registered by the information processing apparatus 200. For example, when the information about the shot number is transmitted from the information processing apparatus 200 to the imaging apparatus 100 in Step S502, in Step S511, the system control unit 113 determines that the shot number is newly registered (Yes in Step S511) and the process goes to Step S513. In Step S513, the system control unit 113 stores the imaging range at the time when the shot number is registered as the target imaging range in the storage unit 115 in association with the information about the shot number that is newly registered. If the shot number is not newly registered (No in Step S511), the process goes to Step S512. In Step S512, the system control unit 113 acquires the information about the current imaging range, that is, the information about the current pan value, the current tilt value, and the current zoom value to determine whether at least one of the pan, the tilt, and the zoom is changed. If at least one of the pan, the tilt, and the zoom is changed (Yes in Step S512), the process goes to Step S514. If at least one of the pan, the tilt, and the zoom is not changed (No in Step S512), the process goes to Step S518. If at least one of the pan, the tilt, and the zoom is being changed in the determination in Step S512, the system control unit 113 may determine that at least one of the pan, the tilt, and the zoom is not changed (No in Step S512) until the changing is stopped and the process may go to Step S518.

In Step S514, the system control unit 113 acquires the information about the pan value, the tilt value, and the zoom value in the target imaging range as the information about the target imaging range corresponding to the registered shot number from the storage unit 115. At this time, the system control unit 113 may acquire only the information about the target imaging range corresponding to the shot number that is newly registered in Step S513 from the storage unit 115. Alternatively, the system control unit 113 may acquire the information about the target imaging range corresponding to each of all the shot numbers that are registered. For example, a case is assumed in which a first shot number and information about a first target imaging range corresponding to the first shot number, and a second shot number and information about a second target imaging range corresponding to the second shot number are stored in the storage unit 115. In this case, the system control unit 113 may acquire the information about the first target imaging range corresponding to the first shot number and the information about the second target imaging range corresponding to the second shot number in Step S514.

In Step S515, the system control unit 113 calculates the amount of drive required to reach the target imaging range based on the target imaging range acquired in Step S514 and the current imaging range of the imaging apparatus 100 for each of the pan, the tilt, and the zoom. When the pan value in the current imaging range is 30 degrees and the pan value in the target imaging range is −150 degrees, the system control unit 113 calculates the amount of drive in the pan drive unit 103 as 180 degrees. When the tilt value in the current imaging range is 0 degrees and the tilt value in the target imaging range is 40 degrees, the system control unit 113 calculates the amount of drive in the tilt drive unit 104 as 40 degrees. When the zoom value in the current imaging range is 20 degrees and the zoom value in the target imaging range is 50 degrees, the system control unit 113 calculates the amount of drive in the lens drive unit 102 as 30 degrees.

In Step S516, the system control unit 113 calculates the required time of each of the pan, the tilt, and the zoom to reach the target imaging range based on the amount of drive of each of the pan drive system, the tilt drive system, and the zoom drive system, calculated in Step S515, and the maximum speed defined for each of the pan drive system, the tilt drive system, and the zoom drive system. For example, a case is assumed in which the amount of drive in the pan drive unit 103 calculated in Step S515 is 180 degrees and the maximum speed defined for the pan drive unit 103 is 30 degrees/sec. In this case, the system control unit 113 calculates the required time to reach the target imaging range from the current imaging range in the pan direction 105 (the pan required time) as six seconds when the pan drive unit 103 is driven at the maximum speed. Similarly, a case is assumed in which the amount of drive in the tilt drive unit 104 is 40 degrees and the maximum speed defined for the tilt drive unit 104 is 20 degrees/Sec. In this case, the system control unit 113 calculates the required time to reach the target imaging range from the current imaging range in the tilt direction 106 (the tilt required time) as two seconds when the tilt drive unit 104 is driven at the maximum speed. Similarly, a case is assumed in which the amount of drive in the lens drive unit 102 is 30 degrees and the maximum speed defined for the lens drive unit 102 is 15 degrees/sec. In this case, the system control unit 113 calculates the required time to reach the target imaging range from the current imaging range in the zoom (the zoom required time) as two seconds when the lens drive unit 102 is driven at the maximum speed.

In Step S517, the system control unit 113 calculates the longest required time, among the pan required time, the tilt required time, and the zoom required time calculated in Step S516, as the required time from the current imaging range to the target imaging range in the shot operation. In the shot operation, the required time from the current imaging range to the target imaging range is calculated in accordance with the drive system having the longest required time to concurrently start and terminate the respective drive systems. For example, a case is assumed in which the pan required time is six seconds, the tilt required time is two seconds, and the zoom required time is two seconds. In this case, the system control unit 113 calculates the required time of the shot operation from the current imaging range to the target imaging range as six seconds and transmits the information about the calculated required time of the shot operation to the information processing apparatus 200 in accordance with the shot number of the target imaging range. The case is described in the description from Step S515 to Step S517, in which the required time of the shot operation from the current imaging range to a certain target imaging range is calculated. However, when multiple different target imaging ranges are acquired in Step S514, Step S515 to Step S517 are performed for each of the multiple different target imaging ranges to calculate the required time of the shot operation from the current imaging range to each of the multiple different target imaging ranges.

For example, a case is assumed in which the information about the first target imaging range and the second target imaging range is acquired in Step S514. In this case, the system control unit 113 calculates the required time of the shot operation from the current imaging range to the first target imaging range and the required time of the shot operation from the current imaging range to the second target imaging range. At this time, the system control unit 113 controls the communication unit 116 so that the required time of the shot operation to the first target imaging range is transmitted to the information processing apparatus 200 in association with the first shot number corresponding to the first target imaging range. In addition, the system control unit 113 controls the communication unit 116 so that the required time of the shot operation to the second target imaging range is transmitted to the information processing apparatus 200 in association with the second shot number corresponding to the second target imaging range. As described above, in Step S505, the system control unit 203 in the information processing apparatus 200 acquires the required time corresponding to the shot number specified by the user in Step S503 from the information received from the imaging apparatus 100. The processing from Step S515 to Step S517 may be performed only for the target imaging range corresponding to the shot number selected by the user in Step S503. Specifically, upon selection of the shot number by the user in Step S503, the information about the shot number is transmitted to the imaging apparatus 100. In the processing from Step S515 to Step S517, the required time of the shot operation may be calculated only for the target imaging range corresponding to the transmitted shot number.

In Step S518, the system control unit 113 is on standby for a predetermined time period before making a transition to Step S511. The standby time may be set in consideration of the load at the camera side or the responsibility or may be set by the user.

Figure 6A:
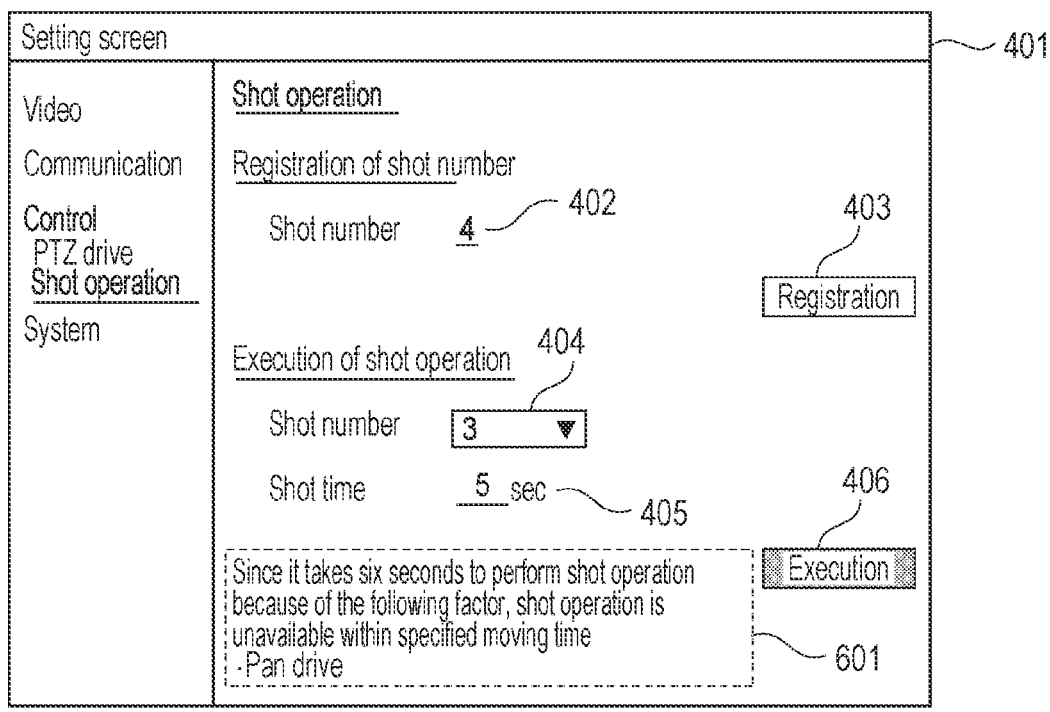
FIG. 6A, FIG. 6B, and FIG. 6C illustrate the setting screens of the shot operation.
Figure 6B:
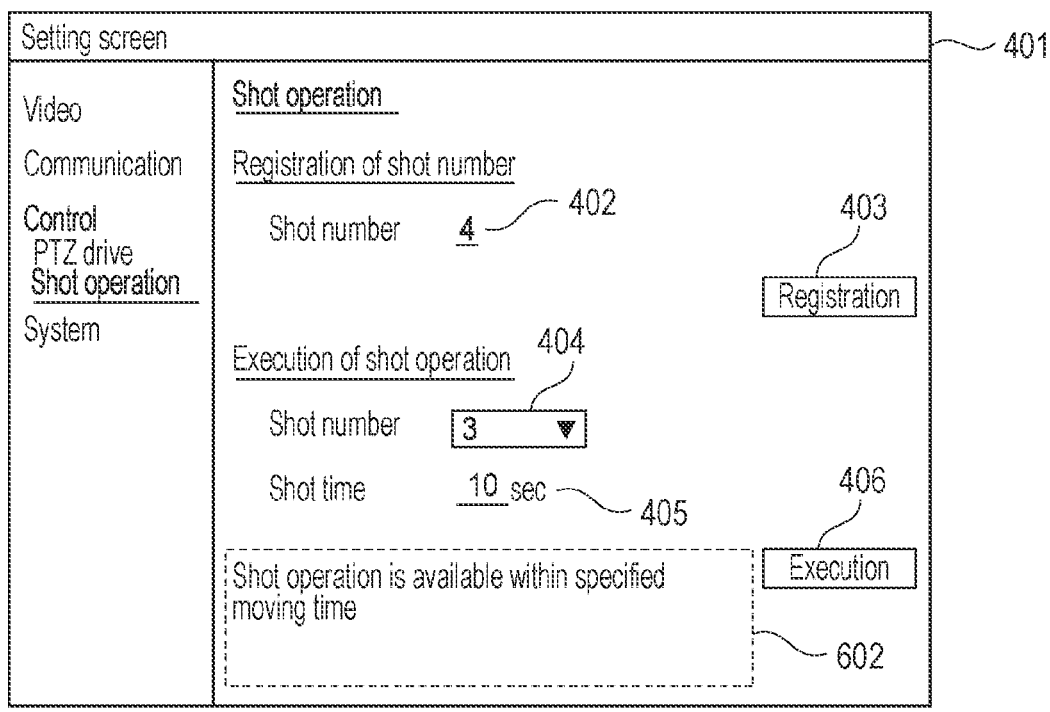
Figure 6C:
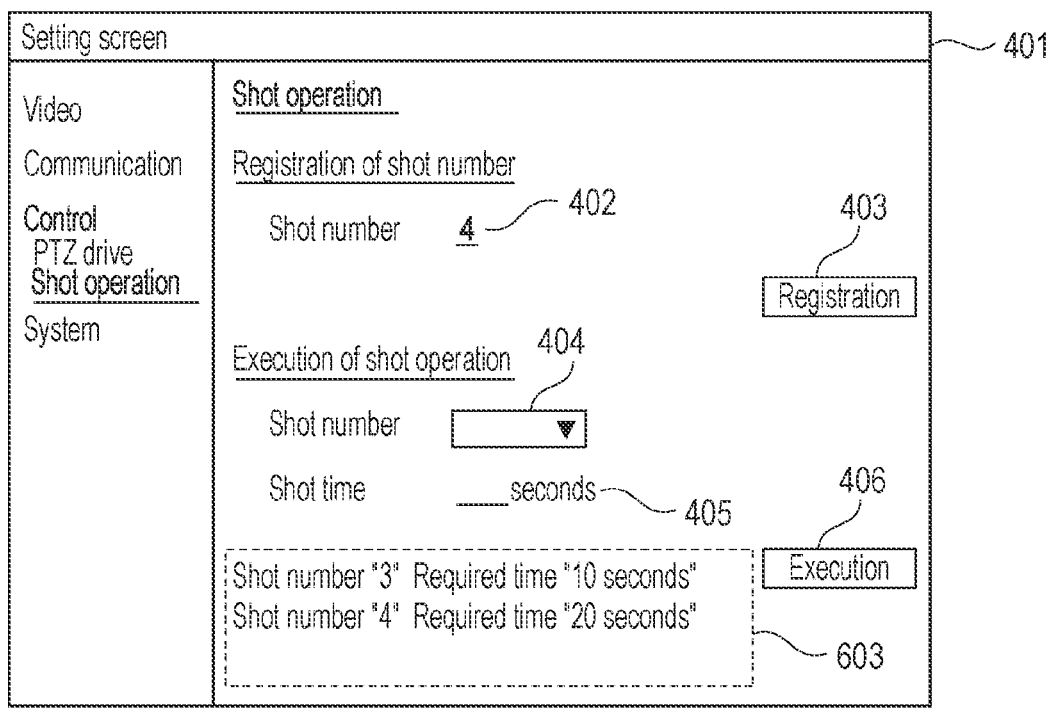

Information about the result of comparison displayed by the display control unit 201 in Step S507 will now be described with reference to FIG. 6A to FIG. 6C. A case is assumed in which the moving time input with the Input of shot time 405 is "five seconds" and the required time to the target imaging range corresponding to the shot number "3" selected with the Selection of shot number 404 is "six seconds". In this case, as illustrated in FIG. 6A, the display control unit 201 displays information 601 indicating that the shot operation is unavailable within the moving time input with the Input of shot time 405. The display control unit 201 may display information indicating a factor causing the unavailability of the shot operation within the specified moving time, as illustrated in FIG. 6A. At this time, not only the information indicating the required time "six seconds" to the target imaging range corresponding to the shot number "3" but also the information about the pan required time, the tilt required time, and the zoom required time in the target imaging range are transmitted from the imaging apparatus 100 to the information processing apparatus 200. The system control unit 203 in the information processing apparatus 200 compares the specified moving time with each of the pan required time, the tilt required time, and the zoom required time. The system control unit 203 identifies the required time of the drive system, which exceeds the moving time, based on the result of comparison and determines that the identified drive system is the factor causing the unavailability of the shot operation within the moving time. For example, if the pan required time is longer than the specified moving time, the system control unit 203 identifies the pan drive unit 103 as the factor causing the unavailability of the shot operation within the moving time. At this time, the display control unit 201 displays information indicating the pan drive as the factor causing the unavailability of the shot operation within the specified moving time, as illustrated in FIG. 6A. If the required time to the target imaging range is longer than the specified moving time, the shot operation is not capable of being completed within the moving time. Accordingly, the display control unit 201 may gray out the Execution button 406 and the system control unit 203 may not accept the execution of the shot operation.

A case is assumed in which the moving time input with the Input of shot time 405 is "10 seconds" and the required time to the target imaging range corresponding to the shot number "3" selected with the Selection of shot number 404 is "six seconds". In this case, the display control unit 201 displays information 602 indicating that the shot operation to the target imaging range is available within the specified moving time in Step S507, as illustrated in FIG. 6B. At this time, when the Execution button 406 is touched by the user, the system control unit 203 transmits the information about the specified moving time "10 seconds" and the information about the shot number "3" selected with the Selection of shot number 404 to the imaging apparatus 100. The imaging apparatus 100 performs the shot operation so as to reach the target imaging range corresponding to the shot number "3" within the specified moving time "10 seconds". Here, a case is assumed in which the amount of drive in the pan drive unit 103 is 180 degrees, the amount of drive in the tilt drive unit 104 is 40 degrees, and the amount of drive in the lens drive unit 102 is 30 degrees as the amounts of drive of the respective drive system from the current imaging range to the target imaging range, which are calculated in Step S515. In this case, the system control unit 113 calculates the speeds of the respective drive systems at which the drive of the respective drive systems is completed within the specified moving time "10 seconds", Specifically, the system control unit 113 calculates the driving speed in the pan drive unit 103 as 18 degrees/sec, the driving speed in the tilt drive unit 104 as four seconds/sec, and the driving speed in the lens drive unit 102 as three degrees/sec. The system control unit 113 concurrently starts the control of the respective drive systems and concurrently terminates the control of the respective drive systems in accordance with the calculated speeds of the respective drive systems to perform the shot operation to the target imaging range.

A case is assumed in which the information about the shot number in the target imaging range and the information about the required time to the target imaging range are transmitted from the imaging apparatus 100 to the information processing apparatus 200 for each of the multiple different target imaging ranges from the current imaging range. In this case, the display control unit 201 may display the required time to each of the multiple different target imaging ranges on the Setting screen 401. For example, the display control unit 201 displays the first required time (the required time "10 seconds") to the first target imaging range corresponding to the first shot number (the shot number "3") with the first shot number, as illustrated in a message 603 in FIG. 6C. In addition, the display control unit 201 displays the second required time (the required time "20 seconds") to the second target imaging range corresponding to the second shot number (the shot number "4") with the second shot number, as illustrated in the message 603 in FIG. 6C.

As described above, in the present embodiment, the required time to the target imaging range is calculated based on the current imaging range and the target imaging range and the information indicating the result of comparison between the calculated required time and the moving time specified by the user is displayed. This enables the user to determine in advance whether the shot operation is available within the specified moving time in prior to the execution of the shot operation.

Other Embodiments

The hardware configuration of the imaging apparatus 100 for realizing the respective functions of the embodiment will now be described with reference to FIG. 7. Although the hardware configuration of the imaging apparatus 100 is described below, the information processing apparatus 200 has the same hardware configuration.

The imaging apparatus 100 according to the present embodiment includes the CPU 700, a random access memory (RAM) 710, the ROM 720, a hard disk drive (HDD) 730, and the I/F 740.

The CPU 700 controls the entire imaging apparatus 100. The RAM 710 temporarily stores the computer programs executed by the CPU 700. In addition, the RAM 710 provides a working area used by the CPU 700 to perform the processes. The RAM 710 functions as, for example, a frame memory or a buffer memory.

The ROM 720 stores programs used by the CPU 700 to control the imaging apparatus 100 and so on. The HDD 730 is a storage device recording image data and so on.

The I/F 740 communicates with an external apparatus via the network 300 in accordance with transmission control protocol/Internet protocol (TCP/IP), HTTP, or the like.

Although the example is described above in which the CPU 700 performs the processes, at least part of the processes performed by the CPU 700 may be performed by dedicated hardware. For example, a process to display a graphical user interface (GUI) or image data in the display 210 may be performed by a graphics processing unit (GPU). A process to read out program code from the ROM 720 and decompose the program code in the RAM 710 may be performed by direct memory access (DMA) functioning as a transfer apparatus.

The present disclosure is capable of being realized by a process to read out and execute a program realizing one or more functions of the above embodiment by one or more processors. The program may be supplied to a system or an apparatus including the processor via a network or a storage medium.

The present disclosure is capable of being realized by a circuit (for example, an application specific integrated circuit (ASIC)) realizing one or more functions of the above embodiment. Each component in the imaging apparatus 100 may be realized by the hardware illustrated in FIG. 7 or may be realized by software.

Another apparatus may have one or more functions of the imaging apparatus 100 according to the above embodiment. For example, the information processing apparatus 200 may have one or more functions of the imaging apparatus 100 according to the above embodiment.

Although the present disclosure is described using the embodiments, the above embodiments are only examples to embody the present disclosure and the technical scope of the present disclosure is not limitedly interpreted by the embodiments. In other words, the present disclosure may be embodied in various aspects within the technical idea or the main features thereof. For example, embodiments resulting from combination of the respective embodiments are included in the disclosure of the present specification.

According to the embodiments described above, it is possible to provide a technique to enable the user to determine in advance whether the imaging apparatus is capable of reaching the target imaging range from the current imaging range within the specified moving time.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-058390 filed Mar. 30, 2021, which is hereby incorporated by reference herein in its entirety.

What is claimed is:

1. An information processing apparatus comprising a computer executing instructions that, when executed by the computer, cause the computer to:
    accept information on a user's operation to specify a target imaging range, which is an imaging range to be attained, of an imaging apparatus that captures an image;
    accept information on a user's operation to specify a moving time, which is a time to reach the target imaging range from a current imaging range of the imaging apparatus; and
    cause a display to display information indicating a result of comparison between the moving time and a required time required to reach the target imaging range from the current imaging range, the required time being calculated based on the current imaging range of the imaging apparatus and the target imaging range,
    wherein the imaging apparatus is capable of varying the imaging range by changing at least one of pan, tilt and zoom, and
    wherein the required time corresponds to a longest time, among (a) a pan required time required to change the pan so as to reach the target imaging range from the current imaging range, (b) a tilt required time required to change the tilt so as to reach the target imaging range from the current imaging range, and (c) a zoom required time required to change the zoom so as to reach the target imaging range from the current imaging range.

2. The information processing apparatus according to claim 1,
    wherein, if the required time is longer than the moving time, information indicating that a shot operation from the current imaging range to the target imaging range is unavailable within the moving time is to be displayed in the display.

3. The information processing apparatus according to claim 1,
    wherein, if the moving time is longer than the required time, information indicating that a shot operation from the current imaging range to the target imaging range is available within the moving time is to be displayed in the display.

4. The information processing apparatus according to claim 1, wherein the instructions cause the computer to
    perform a process for making a shot operation from the current imaging range to the target imaging range unavailable if the required time is longer than the moving time.

5. An information processing method comprising:
    accepting information on a user's operation to specify a target imaging range, which is an imaging range to be attained, of an imaging apparatus that captures an image;
    accepting information on a user's operation to specify a moving time, which is a time to reach the target imaging range from a current imaging range of the imaging apparatus; and
    causing a display to display information indicating a result of comparison between the moving time and a required time required to reach the target imaging range from the current imaging range, the required time being calculated based on the current imaging range of the imaging apparatus and the target imaging range,
    wherein the imaging apparatus is capable of varying the imaging range by changing at least one of pan, tilt and zoom, and
    wherein the required time corresponds to a longest time, among (a) a pan required time required to change the pan so as to reach the target imaging range from the current imaging range, (b) a tilt required time required to change the tilt so as to reach the target imaging range from the current imaging range, and (c) a zoom required time required to change the zoom so as to reach the target imaging range from the current imaging range.

6. The information processing method according to claim 5,
    wherein, if the required time is longer than the moving time, information indicating that a shot operation from the current imaging range to the target imaging range is unavailable within the moving time is to be displayed in the display.

7. The information processing method according to claim 5,
    wherein, if the moving time is longer than the required time, information indicating that a shot operation from the current imaging range to the target imaging range is available within the moving time is to be displayed in the display.

8. The information processing method according to claim 5, further comprising:
    performing a process for making a shot operation from the current imaging range to the target imaging range unavailable if the required time is longer than the moving time.

9. A computer-readable non-volatile recording medium causing a computer to perform an information processing method comprising:
    accepting information on a user's operation to specify a target imaging range, which is an imaging range to be attained, of an imaging apparatus that captures an image;
    accepting information on a user's operation to specify a moving time, which is a time to reach the target imaging range from a current imaging range of the imaging apparatus; and
    causing a display to display information indicating a result of comparison between the moving time and a required time required to reach the target imaging range from the current imaging range, the required time being calculated based on the current imaging range of the imaging apparatus and the target imaging range, wherein the imaging apparatus is capable of varying the imaging range by changing at least one of pan, tilt and zoom, and wherein the required time corresponds to a longest time, among (a) a pan required time required to change the pan so as to reach the target imaging range from the current imaging range, (b) a tilt required time required to change the tilt so as to reach the target imaging range from the current imaging range, and (c) a zoom required time required to change the zoom so as to reach the target imaging range from the current imaging range.

* * * * *